United States Patent
Yun et al.

(10) Patent No.: US 9,889,753 B2
(45) Date of Patent: Feb. 13, 2018

(54) DRIVING APPARATUS FOR ELECTRIC VEHICLE

(71) Applicant: LG ELECTRONICS INC., Seoul (KR)

(72) Inventors: Junbo Yun, Seoul (KR); Heeseok Jeong, Seoul (KR); Suyoung Yun, Seoul (KR)

(73) Assignee: LG Electronics Inc., Seoul (KR)

( * ) Notice: Subject to any disclaimer, the term of this patent is extended or adjusted under 35 U.S.C. 154(b) by 466 days.

(21) Appl. No.: 14/541,702

(22) Filed: Nov. 14, 2014

(65) Prior Publication Data

US 2016/0137078 A1    May 19, 2016

(51) Int. Cl.
| | | |
|---|---|---|
| B60L 1/00 | (2006.01) | |
| B60L 3/00 | (2006.01) | |
| H02G 1/00 | (2006.01) | |
| B60L 11/18 | (2006.01) | |
| B60L 11/08 | (2006.01) | |

(52) U.S. Cl.
CPC ......... *B60L 11/1812* (2013.01); *B60L 11/08* (2013.01); *Y02T 10/7005* (2013.01); *Y02T 10/7077* (2013.01); *Y02T 10/7241* (2013.01)

(58) Field of Classification Search
CPC .. B60L 11/1812; B60L 11/08; Y02T 10/7241; Y02T 10/7005; Y02T 10/7077
See application file for complete search history.

(56) References Cited

U.S. PATENT DOCUMENTS

| | | | | |
|---|---|---|---|---|
| 4,189,668 A  * | 2/1980 | Willcock | .................. | H02P 3/12 318/375 |
| 4,539,515 A  * | 9/1985 | Morishita | ............. | H02J 7/1423 307/16 |
| 4,564,799 A  * | 1/1986 | Iwaki | .................... | H02J 7/1423 307/84 |
| 9,037,334 B1 * | 5/2015 | Cole | ..................... | B60W 10/06 701/22 |
| 2004/0232881 A1* | 11/2004 | Amano | .................. | B60L 11/14 320/104 |
| 2011/0149611 A1* | 6/2011 | Moussaoui | ....... | H02M 3/33584 363/21.04 |
| 2012/0098489 A1* | 4/2012 | Arai | ..................... | B60L 3/0046 320/109 |

(Continued)

FOREIGN PATENT DOCUMENTS

| | | |
|---|---|---|
| JP | 2004229461 A | 8/2004 |
| JP | 2011223680 A | 11/2011 |

(Continued)

OTHER PUBLICATIONS

Notice of Allowance dated Mar. 20, 2015 from corresponding Korean Patent Application No. 10-2013-0078975, 3 pages.

*Primary Examiner* — Jared Fureman
*Assistant Examiner* — Esayas Yeshaw
(74) *Attorney, Agent, or Firm* — Fish & Richardson P.C.

(57) ABSTRACT

A driving apparatus for an electric vehicle is provided. The driving apparatus for the electric vehicle can charge the other batteries using a charging voltage of any one battery in a state in which an engine is not driven, control a voltage generated by an integrated starter generator (ISG), selectively charge a plurality of batteries having different charging voltages without using a separate converter, and reduce a weight and volume thereof.

15 Claims, 21 Drawing Sheets

(56) References Cited

U.S. PATENT DOCUMENTS

| | | | |
|---|---|---|---|
| 2012/0104768 A1* | 5/2012 | Gibson | B60L 1/003 290/36 R |
| 2013/0020863 A1* | 1/2013 | Sugiyama | B60L 11/1868 307/9.1 |
| 2013/0147431 A1* | 6/2013 | Lim | H02J 7/022 320/109 |
| 2015/0171820 A1* | 6/2015 | Koike | H02J 5/005 320/109 |
| 2016/0001719 A1* | 1/2016 | Frost | B60L 11/1868 307/10.1 |
| 2016/0152153 A1* | 6/2016 | Yang | B60L 1/003 320/109 |

FOREIGN PATENT DOCUMENTS

| | | |
|---|---|---|
| JP | 05413505 B2 | 2/2014 |
| JP | 05558176 B2 | 7/2014 |
| WO | WO2011132269 A1 | 10/2011 |

* cited by examiner (a)

(b)

ic vehicle.

DRIVING APPARATUS FOR ELECTRIC VEHICLE

TECHNICAL FIELD

The present application relates to a driving apparatus for an electric vehicle.

BACKGROUND

Recently, with increasingly stringent environmental regulations and to reduce energy costs, demand for eco-friendly electric vehicles (EVs) has increased. In the United States and Europe, electric vehicles will be forced into widespread use due to the Clean Air Conservation Act. Domestically, research into green cars has been actively conducted as a part of green growth.

A battery is provided in an electric vehicle in order to drive a motor for driving the vehicle and various electronic apparatuses. In addition, an air conditioner for air conditioning or heating is provided.

In addition, an integrated starter generator (ISG) for starting an engine and rotating a motor is provided in an electric vehicle. The ISG operates in a motoring mode for rotating the motor and a generating mode for generating a predetermined output voltage to charge a battery.

A plurality of batteries having different charging voltages may be provided in the electric vehicle. At this time, each battery may be charged in the generating mode of the ISG.

As the ISG is generally configured to generate a high output voltage, a high-voltage battery may be charged via the output voltage of the ISG but a low-voltage battery may not be charged via the output voltage of the ISG. Thus, a separate DC-DC converter is required.

That is, the DC-DC converter performs a function for decreasing the high output voltage of the ISG to a charging voltage of the low-voltage battery.

However, the DC-DC converter has a heavy weight and a large volume, thereby increasing the weight of the electric vehicle and reducing an internal space for use. In addition, the DC-DC converter may deteriorate efficiency of the electric vehicle.

Accordingly, even when a plurality of batteries having different charging voltages is provided, there is a need for a structure for charging each battery via a single ISG without a separate DC-DC converter.

In order to charge a high-voltage battery and a low-voltage battery using an ISG, rotation force of an engine should be delivered to the ISG. At this time, it is difficult to charge the high-voltage battery and the low-voltage battery using the ISG in a state in which the engine is not driven.

Accordingly, there is a need for a structure for emergency-charging a low-voltage battery even in a state in which an engine is not driven.

SUMMARY

Accordingly, the present application is directed to a driving apparatus for an electric vehicle that can substantially obviate one or more problems due to limitations and disadvantages of the related art.

An object of the present application is to provide a driving apparatus for an electric vehicle capable of charging the other batteries using any one battery in a state in which an engine is stopped.

Another object of the present application may be to provide a driving apparatus for an electric vehicle capable of controlling a voltage generated by an ISG.

Another object of the present application may be to provide a driving apparatus for an electric vehicle capable of selectively charging a plurality of batteries having different charging voltages without using a separate DC-DC converter.

Another object of the present application may be to provide a driving apparatus for an electric vehicle having a low weight and a small volume and capable of making better use of a space.

Additional advantages, objects, and features of the application will be set forth in part in the description which follows and in part will become apparent to those having ordinary skill in the art upon examination of the following or may be learned from practice of the application. The objectives and other advantages of the application may be realized and attained by the structure particularly pointed out in the written description and claims hereof as well as the appended drawings.

To achieve these objects and other advantages and in accordance with the purpose of the application, as embodied and broadly described herein, a driving apparatus for an electric vehicle includes a motor including a rotor having a field coil and a stator having an armature coil, an engine configured to selectively rotate the rotor, a first battery configured to drive the motor or configured to be chargeable by the motor, a second battery configured to be chargeable by the motor and having a charging voltage lower than that of the first battery, and a motor controller including an inverter circuit connected to the armature coil and a field current controller connected to the field coil.

The field current controller may include a diode and a control switching element so as to configure a buck converter together with the first battery, the second battery and the field coil.

It is to be understood that both the foregoing general description and the following detailed description of the present application are exemplary and explanatory and are intended to provide further explanation of the application as claimed.

BRIEF DESCRIPTION OF THE DRAWINGS

The accompanying drawings, which are included to provide a further understanding of the application and are incorporated in and constitute a part of this application, illustrate implementation(s) of the application and together with the description serve to explain the principle of the application. In the drawings.

DETAILED DESCRIPTION

Figure 1:
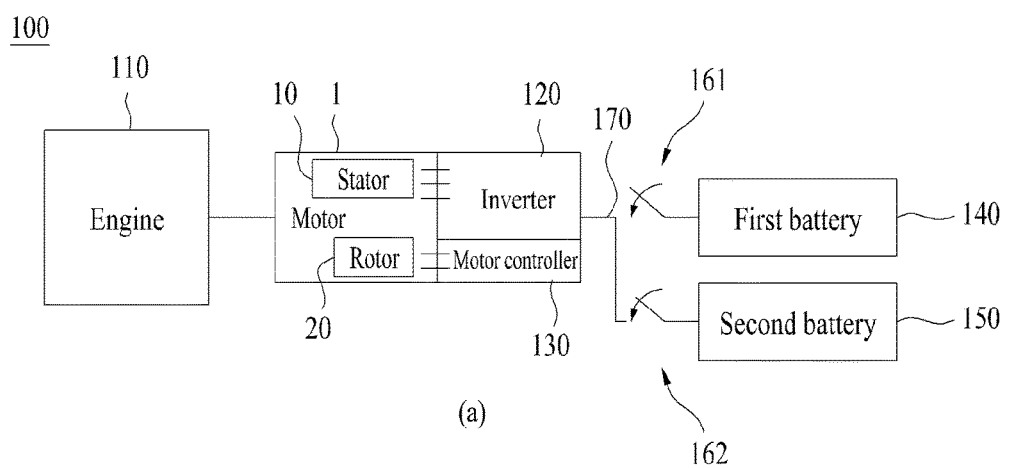
FIG. 1 is a diagram showing the concepts of a driving apparatus for an electric vehicle according to one implementation of the present application.
Figure 1:
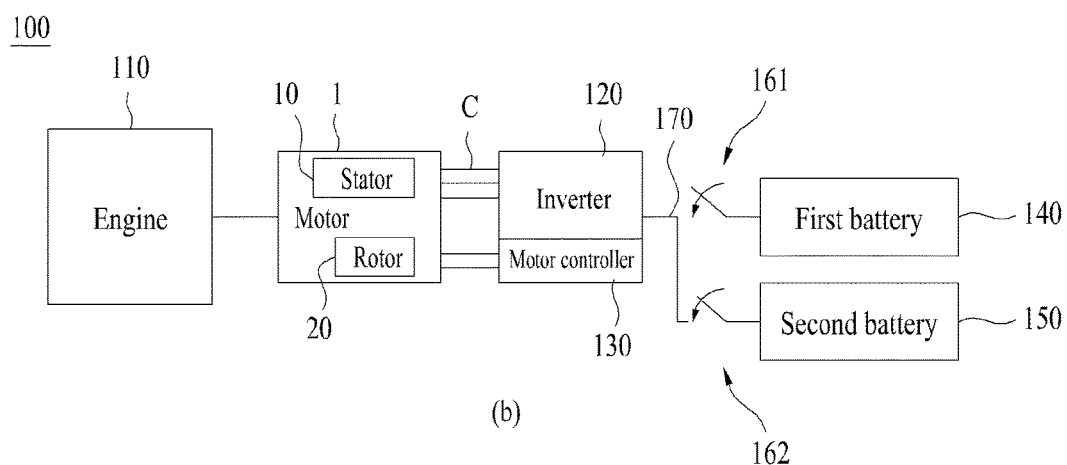

Hereinafter, a driving apparatus for an electric vehicle (hereinafter, also referred to as a driving apparatus) according to one implementation of the present application will be described in detail with reference to the accompanying drawings. The accompanying drawings are only provided for describing the present application in detail and are not intended to limit the technical range of the present application.

In addition, the same or corresponding components are designated by the same reference numerals, and a description thereof will not be repeated. For convenience of description, the size and shape of each component may be exaggerated or reduced.

The terms including ordinals, such as the first or second term, can be used to describe various components, but the components are not limited by the above terms, the term of the one component from the other components are used only for the purpose of distinction.

FIG. 1 is a diagram showing the concepts of a driving apparatus 100 for an electric vehicle according to one implementation of the present application.

Referring to FIG. 1, the driving apparatus 100 according to one implementation of the present application includes a motor 1, an engine 110, a first battery 140, a second battery 150 and a motor controller 130.

Here, the charging voltage of the second battery 150 may be lower than that of the first battery 140. In one implementation, the first battery 140 may have a charging voltage of 43 V and the second battery 150 may have a charging voltage of 12 V.

The motor 1 includes a rotor 20, on which a field coil is wound, and a stator 10, on which an armature coil is wound. More specifically, the motor 1 may be a field winding motor.

The driving apparatus 100 includes an inverter 120 electrically connected to the motor 1 and, more particularly, to the stator 10 of the motor 1.

The inverter 120 may be electrically connected to the stator 10 of the motor 1 and the motor controller 130 may be electrically connected to the rotor 20 of the motor 1.

The motor 1 may operate in a motoring mode such as engine startup or torque assist and a generating mode for generating a predetermined output voltage. The generating mode may include a normal generating mode and a regenerating mode. Accordingly, the motor 1 may be referred to as a driving motor for an electric vehicle or an integrated starter generator (ISG).

At this time, in the generating mode, the motor 1 may selectively charge the first battery 140 and the second battery 150 using the output voltage. The motor 1 may rotate by the engine 110 to operate in the generating mode.

The engine 110 rotates the motor. More specifically, the engine 110 selectively rotates the rotor. A clutch for selectively delivering rotation force may be provided between the engine 110 and the motor 1.

The first battery 140 may drive the motor 1 or may be charged by the motor 1.

The second battery 150 may be charged by the motor 1 and has a charging voltage different from that of the first battery 140. For example, the second battery 150 may have a charging voltage of 12 V and the first battery 140 may be a high-voltage battery having a charging voltage higher than that of the second battery 150. In one implementation, the first battery 140 may have a charging voltage of 48 V or 43 V.

The motor controller 130 may selectively charge the first battery 140 or the second battery 150 by controlling the field current value applied to the field coil based on at least one of the residual quantities of the first battery 140 and the second battery 150 and the driving state of the engine 110.

The driving state of the engine 110 may include an on/off state of the engine 110 and a revolutions per minute (RPM) of the engine.

The driving apparatus 100 may include a first battery switch 161 provided between an output voltage end of the motor 1 and the first battery 140 and a second battery switch 162 provided between an output voltage end of the motor 1 and the second battery 150.

The output voltage end of the motor 1 may be provided at the side of the inverter 120 and may be referred to as an input voltage end when the first battery 140 supplies power to the motor 1.

Hereinafter, the component 170 for electrically connecting the inverter 120 and each battery may be referred to as an output voltage end when the first or second battery 140 or 150 is charged via the motor 1 and the component 170 for electrically connecting the inverter 120 and the first battery 140 may be referred to as an input voltage end when the motor 1 is driven via the first battery 140.

The first battery 140 and the second battery 150 may be connected to the output voltage end 170 of the motor in parallel.

In one implementation, when the first battery 140 is charged due to lack of the residual quantity of the first battery 140, the motor controller 130 may turn the first switch 161 on and turn the second switch 162 off.

Here, the motor controller 130 may control the field current value such that the output voltage of the stator of the motor 1 becomes equal to or greater than the charging voltage of the first battery 140.

In contrast, if the second battery 150 is charged due to lack of the residual quantity of the second battery 150, the motor controller 130 may turn the first switch 161 off and turn the second switch 162 on.

The motor controller 130 may control the field current value such that the output voltage of the stator 10 of the motor 1 becomes equal to or greater than the charging voltage of the second battery 150.

That is, the motor controller 130 may control the field current value such that the motor 1 generates different output voltages without using a separate DC-DC converter.

In the motor controller 130, the output voltage of the stator 10 and the field current value corresponding to the output voltage of the stator 10 may be stored. More specifically, the output voltage of the stator 10 and the field current value corresponding to the output voltage of the stator 10 may be stored in the form of a look-up table.

As described above, the motor controller 130 may include an inverter circuit 133 (see FIG. 2) electrically connected to the armature coil and a field current controller 132 (see FIG. 2) electrically connected to the field coil.

The motor controller 130 may be provided integrally with the motor 1. More specifically, the motor 1, the inverter 120 and the field current controller 130 may be integrally provided. In this case, an internal space of the electric vehicle is secured.

In addition, the motor controller 130 may be cooled via cooling water for cooling the motor 1. Accordingly, cooling efficiency of the motor controller 130 and the inverter 120 may be increased.

Alternatively, the inverter 120 and the motor controller 130 may be integrally provided. The inverter 120, the motor controller 130 and the motor 1 may be separately provided in the electric vehicle. In this case, the inverter 120, the motor controller 130 and the motor 1 may be electrically connected via a cable C.

Hereinafter, the motor 1 and the motor controller 130 will be sequentially described with reference to the accompanying drawings.

Figure 2:
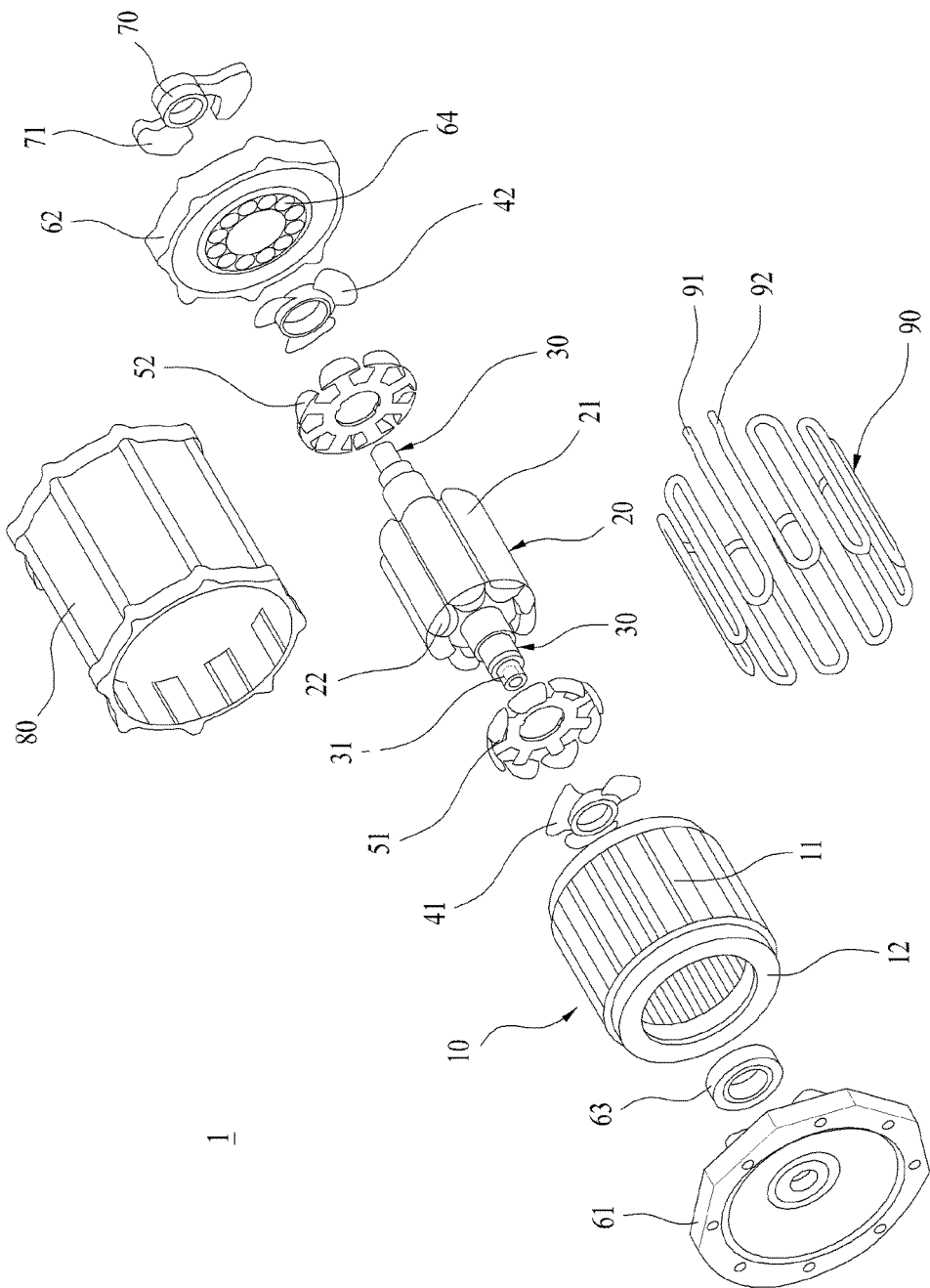
FIG. 2 is an exploded perspective view of a motor applicable to implementations of the present application.

FIG. 2 is an exploded perspective view of a motor 1 applicable to implementations of the present application. More specifically, one implementation of the field winding motor 1 is shown.

The motor 1 may include a stator 10 and a rotor 20. The rotor 20 rotates in the stator 10 via electromagnetic interaction with the stator 10.

The stator 10 may include a stator core 11. The stator 10 may include a stator coil 12 in order to generate a magnetic flux. The stator coil 12 is wound on the stator core 11. Accordingly, the stator 10 may be referred to as an electromagnet.

The rotor 20 may rotate within the stator 10.

The rotor 20 may include a rotor core 21. The rotor 20 may include a rotor coil 22 wound on the rotor core 21.

Here, the rotor coil 22 may be a field coil and the stator coil 12 may be an armature coil. Accordingly, the output of the rotor 20 may be controlled via the field current value and the armature current value respectively applied to the field coil and the armature coil.

As described above, when the motor 1 operates in the generating mode for charging the first battery 140 or the second battery 150, the motor controller 130 may control the field current value applied to the field coil to control the output voltage via the armature coil.

The rotor 20 is connected to a rotation shaft 30 and the rotation shaft 30 may be connected to a driving shaft of the vehicle. Accordingly, the torque and RPM of the rotor 20 may be delivered to the driving shaft of the electric vehicle via the rotation shaft 30. In one implementation, in order to connect the rotation shaft 30 and the driving shaft, a hollow 31 may be formed in the rotation shaft 30. The rotation shaft and the driving shaft may be connected by inserting the driving shaft into the hollow 31.

End plates 51 and 52 may be provided at the front and rear sides of the rotor 20. Accordingly, the field coil 22 may be stably fixed. That is, even when the field coil 22 rotates, the field coil 22 may be stably fixed to the rotor core 21 via the end plates 51 and 52.

A front bracket 61 and a rear bracket 62 may be provided at the front and rear sides of the stator 10 and the rotor 20, respectively. A frame 80 may be provided to surround the stator 10 and the rotor 20. The stator 10 and the rotor 20 may be provided in the brackets and the frame.

A front bearing 63 and a rear bearing 64 may be provided at the front and rear sides of the rotation shaft 30. The rotor 20 and the rotation shaft 30 may be rotatably supported on the brackets via the bearings. The bearings are supported on the brackets. Accordingly, the brackets 61 and 62 may be referred to as bearing housings.

The stator 10 may be stably fixed in the frame 80. Both sides of the frame 80 may be coupled to the front bracket 61 and the rear bracket 62.

A cooling tube 90 for preventing overheating of the motor may be provided. The cooling tube 90 may have a coil shape. The cooling tube 90 may be provided between the stator 10 and the frame 80. Accordingly, as cooling water flows through the cooling tube 90, the stator 10 and the frame 80 may be directly cooled. That is, the cooling tube 90 may be directly brought into contact with the stator 10 to cool the stator 10.

As described above, the cooling tube 90 may extend to cool the inverter 120 and the motor controller 130.

Air flow devices for flowing air in an internal space formed by the frame 80 and the brackets may be provided in the motor 1. The air flow devices may be fans or blades 41 and 42. The blades 41 or 42 are coupled to the rotation shaft 30 to rotate together with the rotation shaft. The blades may be provided at the front and rear sides of the rotation shafts 30.

A pair of slip rings 70 and a pair of brushes 71 are provided outside the rear bracket 62. The slip rings 70 are coupled to the rotation shaft 30. Through the slip rings 70, field current flows in the field coil 22.

That is, the slip rings 70 and the brushes 71 flow the field current from the outside of the rotor 20 to the rotating field coil 22. That is, the field current may be supplied from a DC power source (e.g., the first battery 140) via the brushes 71 and the slip rings 70.

The rear bracket 62 may be formed to fix or externally connect an inlet 91 for supplying cooling water to the cooling coil 90 and an outlet 92 for collecting cooling water. A connection for supplying armature current may be provided in the rear bracket 62.

Figure 3:
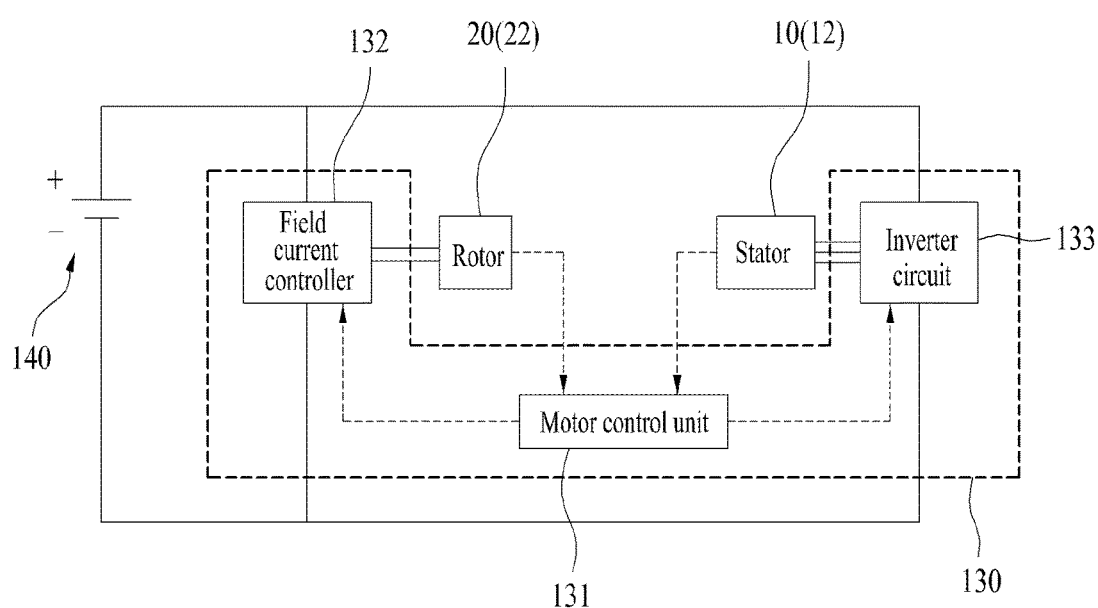
FIG. 3 is a diagram showing the configuration of a motor controller configuring a driving apparatus for an electric vehicle according to one implementation of the present application.

FIG. 3 is a diagram showing the configuration of a motor controller 130 configuring a driving apparatus for an electric vehicle according to one implementation of the present application.

The motor 1 may include the stator 10 and the rotor 20. The rotor 20 rotates in the stator 10 via electromagnetic interaction with the stator 10.

The stator 10 may include an armature coil 12 in order to generate a magnetic flux. Accordingly, the stator 10 may be referred to as an electromagnet.

The rotor 20 may rotate within the stator 10. The rotor 20 may include a field coil 22.

Here, the output of the rotor 20 may be controlled via the field current value and the armature current value respectively applied to the field coil 22 and the armature coil 12.

As described above, when the motor 1 operates in the generating mode for charging the first battery 140 or the second battery 150, the motor controller 130 may control the field current value applied to the field coil to control the output voltage via the armature coil.

The rotor 20 may be connected to a driving shaft of the engine. Accordingly, the torque and RPM of the rotor 20 may be delivered to the driving shaft of the engine 110.

The field current value applied to the field coil and the armature current value applied to the armature coil may be determined by the motor control unit 131. The field current value determined by the motor control unit 131 may be applied to the field coil 22 via the field current controller 132. The armature current value determined by the motor control unit 131 may be applied to the armature coil 12 via the inverter circuit 133.

The motor control unit 131, the field current controller 132 and the inverter circuit 133 may be unified into one module, that is, may be collectively referred to as the motor controller 130.

Figure 4:
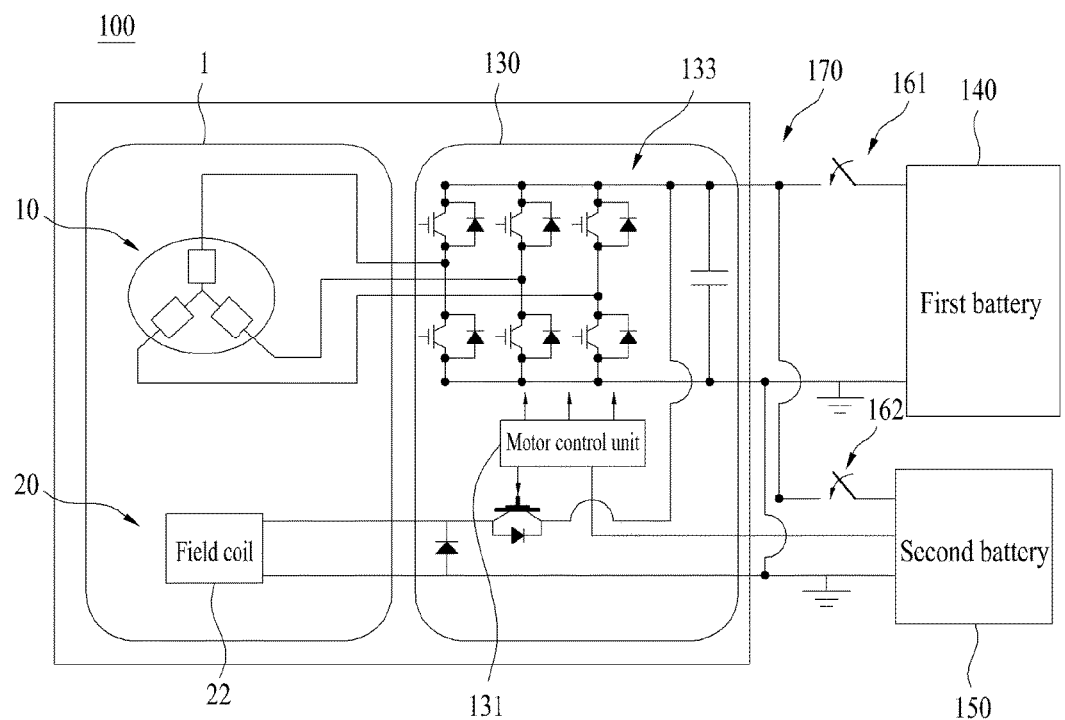
FIG. 4 is a circuit diagram showing a driving apparatus for an electric vehicle according to a first implementation of the present application.
Figure 5A:
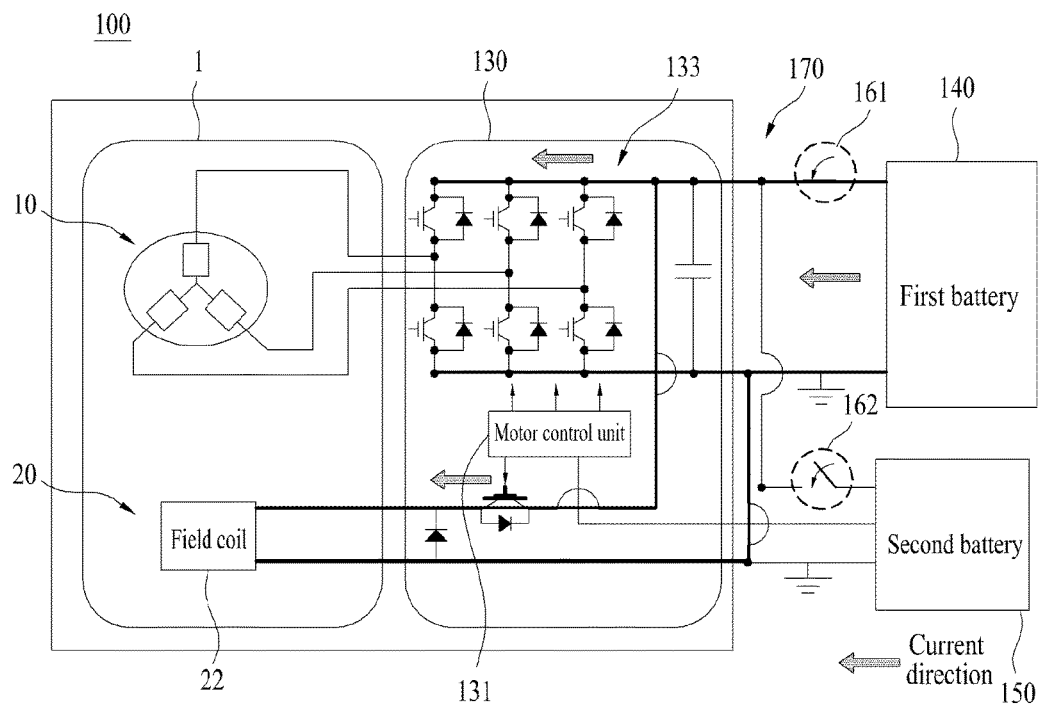
FIGS. 5a to 5c are circuit diagrams illustrating operation states of the driving apparatus for the electric vehicle shown in FIG. 4.
Figure 5B:
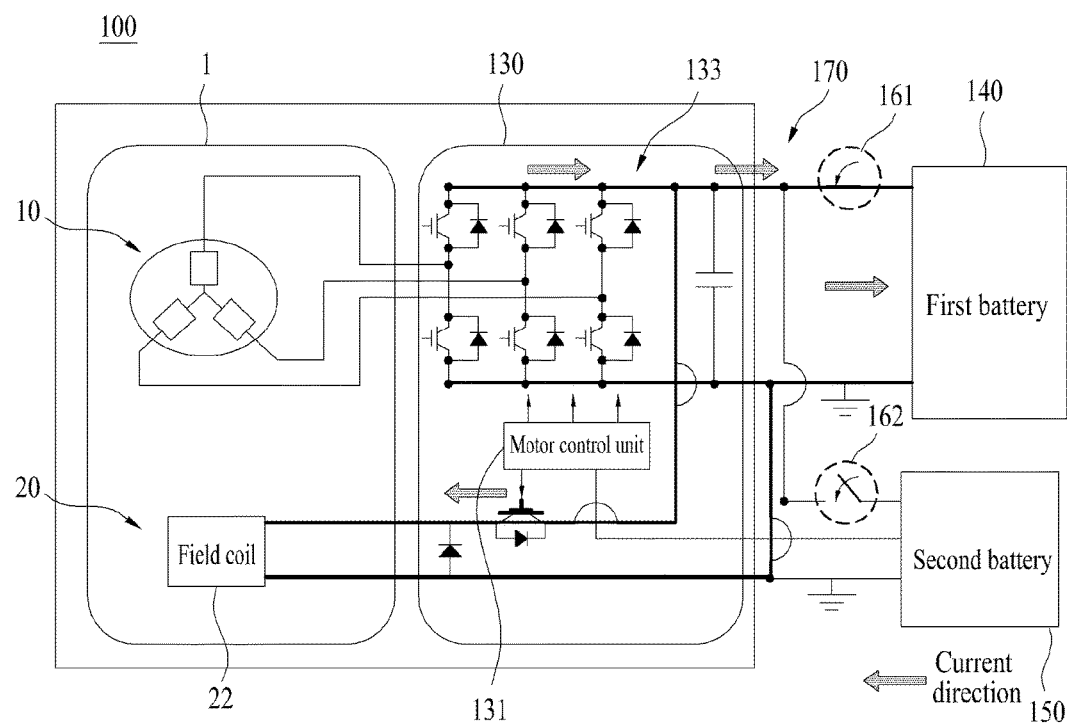
Figure 5C:
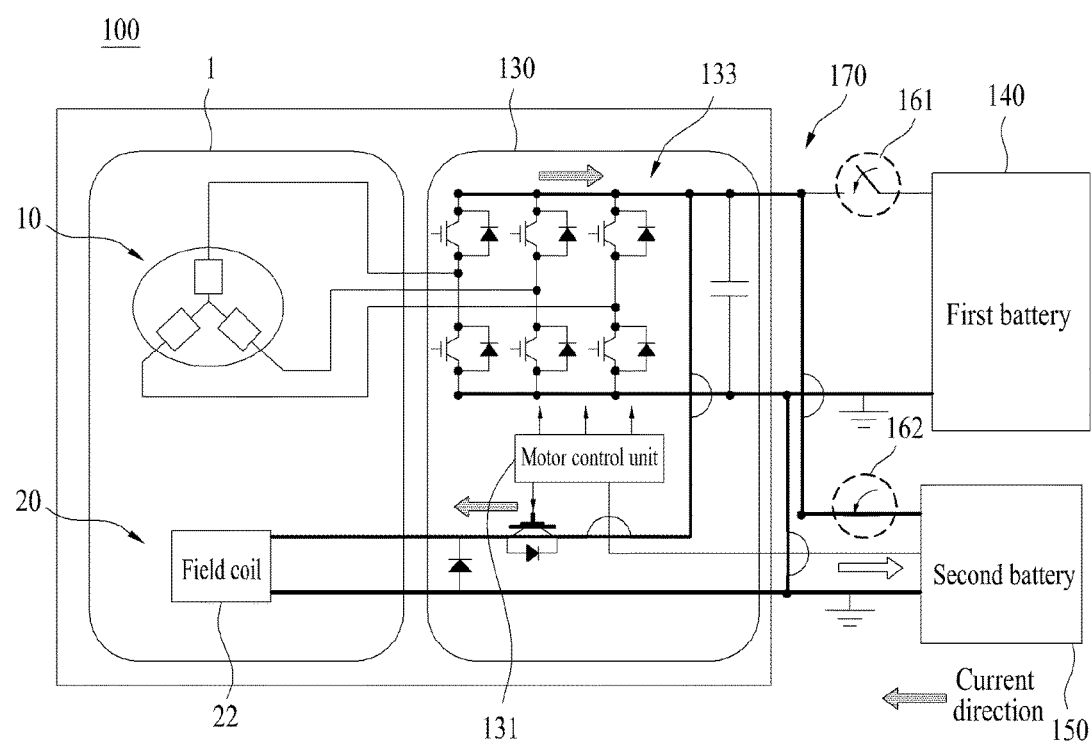

FIG. 4 is a circuit diagram showing a driving apparatus 100 for an electric vehicle according to a first implementation of the present application, and FIGS. 5a to 5c are circuit diagrams illustrating operation states of the driving apparatus for the electric vehicle shown in FIG. 4.

Referring to FIG. 4, the driving apparatus 100 for the electric vehicle according to the first implementation of the present application includes the motor controller 130 for selectively charging the first battery 140 or the second battery 150 by controlling the field current value applied to the field coil 22 based on at least one of the residual quantities of the first battery 140 and the second battery 150 and the driving state of the engine.

In the first implementation, the first battery 140 and the second battery 150 may be connected to the output voltage end 170 of the motor 1 in parallel, a first switch 161 is provided between the output voltage end 170 of the motor 1 and the first battery 140, and a second switch 162 is provided between the output voltage end 170 of the motor 1 and the second battery 150.

In particular, the motor controller 130 selects and charges one of the two batteries via field current value control and switch control using the voltage generated by the motor 1. The battery to be charged may be determined based on the residual quantities of the first battery 140 and the second battery 150.

FIG. 5a is a circuit diagram showing switch control and current direction in the motoring operation of the motor 1.

Referring to FIG. 5a, when the motoring operation of the field winding motor 1 is required, the motor controller 130 turns the first switch 161 on and turns the second switch 162 off.

The motor controller 130 may drive the motor 1 using the first battery 140 (high-voltage battery) such that the motor 1 drives the engine 110 or assists driving torque.

More specifically, when the engine 110 starts up or assists low-speed torque, power may be supplied from the first battery 140 to the inverter 120 to supply current to the rotor 20 and the stator 10, thereby driving the motor 1.

FIG. 5b is a circuit diagram showing switch control and current direction when charging the first battery 140.

Referring to FIG. 5b, when the motor 1 operates in the generating mode due to lack of the residual quantities of the first battery 140 and the second battery 150, the motor controller 130 may confirm the residual quantities of the first battery 140 and the second battery 150.

When the first battery 140 is charged, the motor controller 130 may turn the first switch 161 on and turn the second switch 162 off. The motor controller 130 may control the field current value such that the output voltage of the stator 10 becomes equal to or greater than the charging voltage of the first battery 140.

As described above, in the motor controller 130, the output voltage of the stator and the field current value corresponding to the output voltage of the stator may be stored.

That is, the motor controller 130 may control the field current value such that the voltage generated by the motor 1 is maintained at the voltage of the first battery 140, thereby charging the first battery 140.

The motor controller 10 may charge the first battery 140 in a state in which the engine 110 rotates the motor 1 and, more particularly, in a state in which the engine 110 rotates the rotor 20 of the motor 1.

More specifically, when the first battery 140 is charged in a state in which the engine 110 is driven to rotate the rotor 20 via a belt, the first switch 161 is turned on and the second switch 162 is turned off.

At this time, current is initially delivered from the first battery 140 to the rotor 20 to magnetize the rotor 20, thereby generating a voltage. When the generated voltage is increased to a level for charging the first battery 140 (e.g., 48 V), the first battery 140 starts to be charged. That is, in the initial startup or charging mode, current may be supplied to the rotor 20 via the first battery 140 for a predetermined time.

That is, the motor controller 130 may apply current to the field coil 22 via the first battery 140 in order to charge the first battery 140.

At this time, the motor controller 130 controls the current (field current) of the rotor 20 via the field current controller 132 such that the generated voltage becomes 48 V. Thereafter, the rotor 20 may receive some current generated by the stator 10 to perform self-excited generation.

The motor controller 130 may block supply of current to the field coil when the switch is switched. That is, the switch may be switched when a predetermined amount or less of current flows, by blocking supply of current to the field coil 22.

FIG. 5c is a circuit diagram showing switch control and current direction when charging the second battery 150.

Referring to FIG. 5c, when the second battery 150 (low-voltage battery) needs to be charged, the motor controller 130 turns the second switch 162 on and turn the first switch 161 on. The motor controller 130 may control the field current value such that the output voltage of the stator 10 becomes equal to or greater than the charging voltage (e.g., 12 V) of the second battery 150.

That is, the motor controller 130 may control the field current such that the voltage generated by the motor 1 is maintained at 12 V, thereby charging the second battery 150.

In addition, the motor controller 10 may charge the second battery 150 in a state in which the engine 110 rotates the motor 1 and, more particularly, in a state in which the engine 110 rotates the rotor 20 of the motor 1.

More specifically, when the second battery 150 is charged in a state in which the engine 110 is driven to the rotate the rotor 20 via a belt, the first switch 161 is turned on and the second switch 162 is turned on.

At this time, current is initially delivered from the first battery 140 to the rotor 20 to magnetize the rotor 20, thereby generating a voltage. When the generated voltage is increased to a level for charging the second battery 150 (e.g., 12 V), the second battery 150 starts to be charged.

At this time, the motor controller 130 controls the field current of the rotor 20 via the field current controller 132 such that the generated voltage becomes 12 V. Thereafter, when the rotor 20 may receive some current generated by the stator 10 to perform self-excited generation, the motor controller 130 turns the first switch off.

In summary, the motor controller 130 applies current to the field coil 22 via the first battery 140 in order to charge the second battery 150.

In addition, the motor controller 130 may apply current to the field coil 22 via the first battery 140 during a predetermined time in order to charge the second battery 150 and may not apply current to the field coil 22 after the predetermined time has elapsed.

That is, the motor controller 130 may deliver some current generated by the armature coil to the field coil 22 if the predetermined time has elapsed.

Figure 6:
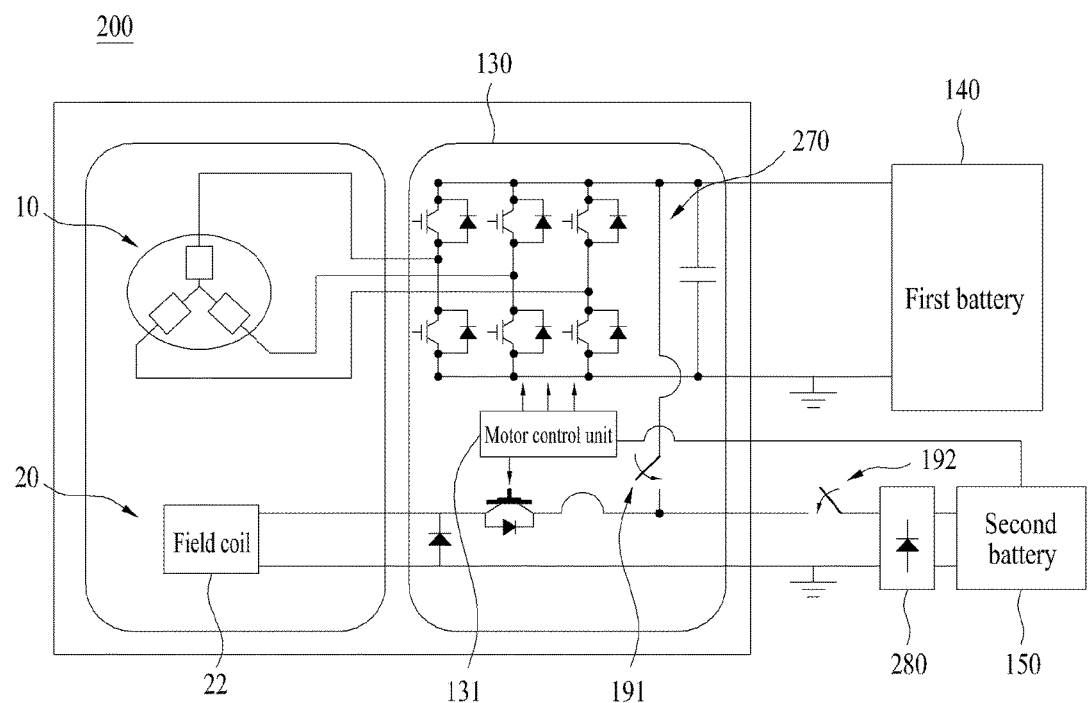
FIG. 6 is a circuit diagram showing a driving apparatus for an electric vehicle according to a second implementation of the present application.
Figure 7A:
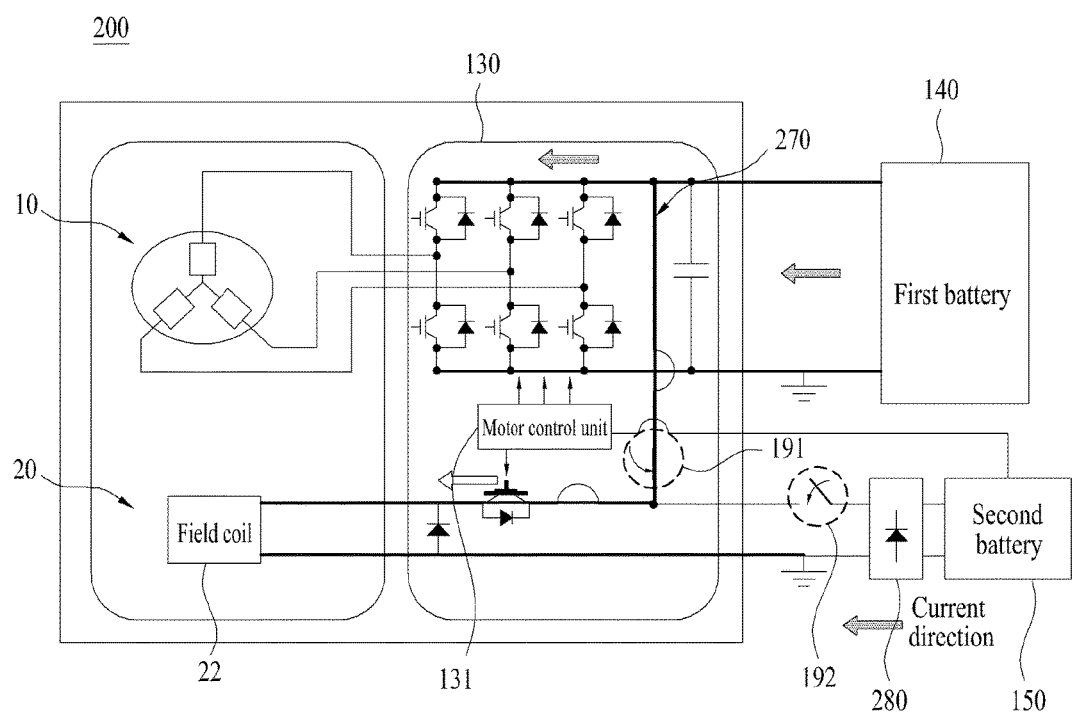
FIGS. 7a to 7c are circuit diagrams illustrating operation states of the driving apparatus for the electric vehicle shown in FIG. 6.
Figure 7B:
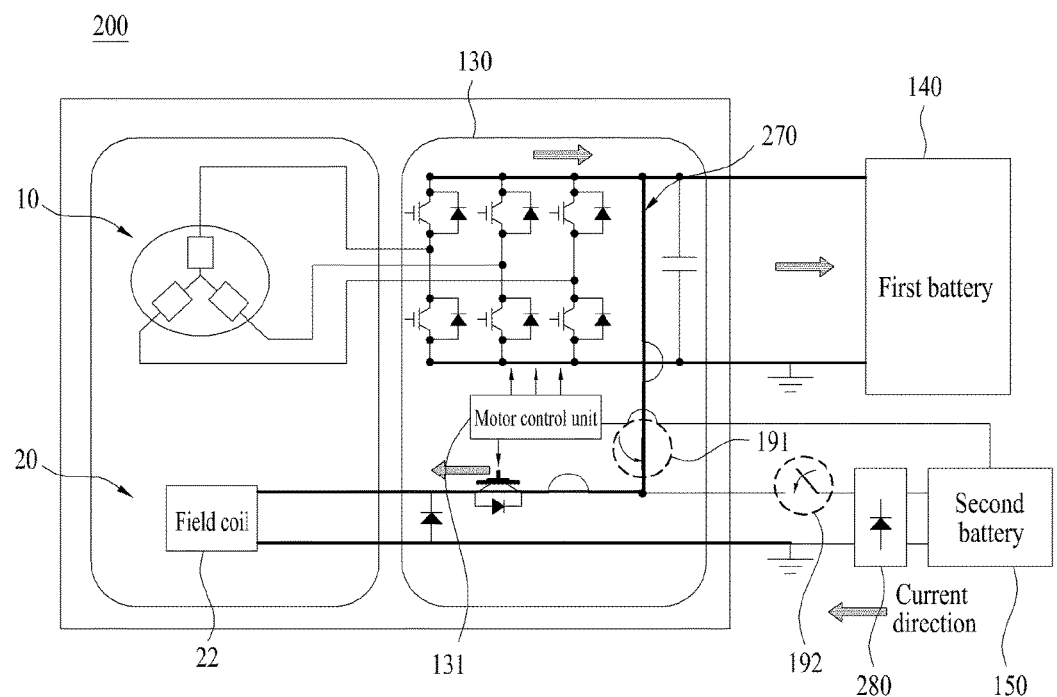
Figure 7C:
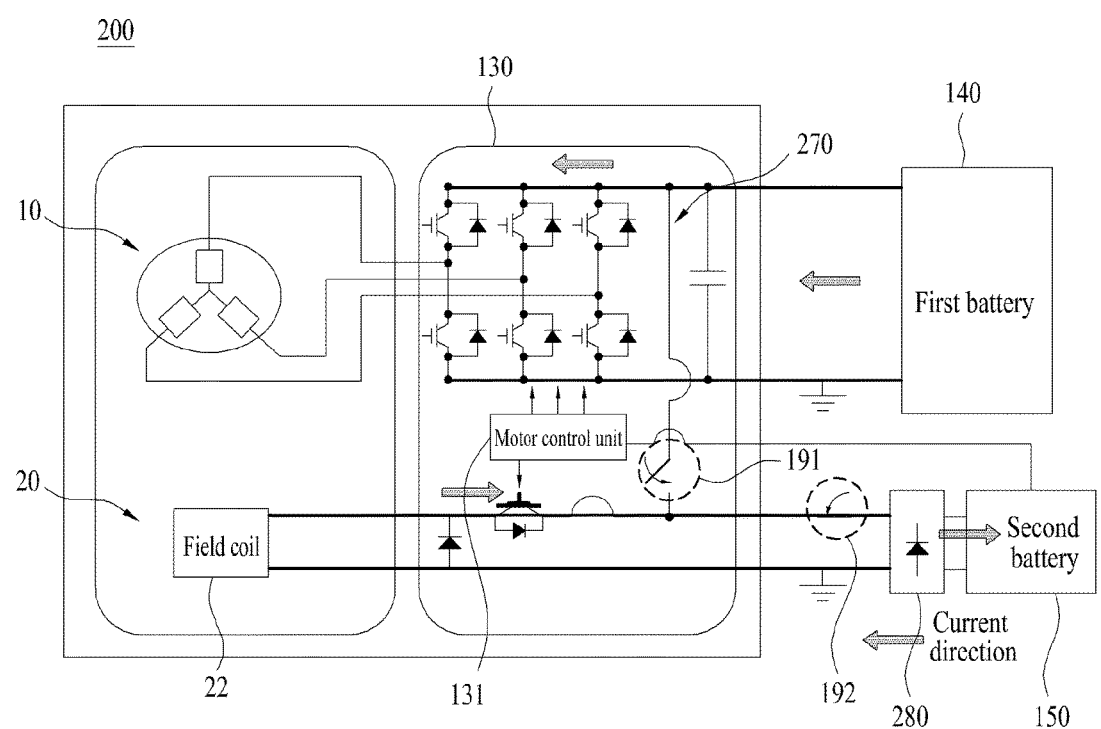

FIG. 6 is a circuit diagram showing a driving apparatus for an electric vehicle according to a second implementation of the present application, and FIGS. 7a to 7c are circuit diagrams illustrating operation states of the driving apparatus for the electric vehicle shown in FIG. 6.

Referring to FIG. 6, in the driving apparatus 200 for the electric vehicle according to the second implementation, a first switch 191 may be provided between the output voltage end of the field coil 22 and the output voltage end of the armature coil and a second switch 192 may be provided between the output voltage end 270 of the motor and the second battery 150.

That is, the second implementation is different from the first implementation in the position of the first switch 191.

FIG. 7a is a circuit diagram showing switch control and current direction in the motoring operation of the motor 1.

When the motoring operation of the field winding motor 1 is required, the motor controller 130 turns the first switch 191 on and turns the second switch 192 off.

The motor controller 130 drives the motor 1 using the first battery 140 such that the motor 1 may drive the engine 110 or assist driving torque.

FIG. 7b is a circuit diagram showing switch control and current direction when charging the first battery 140.

When the first battery 140 is charged in a state in which the engine rotates the rotor, the motor controller 130 may turn the first switch 191 on and control the field current value such that the output voltage of the stator becomes equal to or greater than the charging voltage of the first battery 140.

FIG. 7c is a circuit diagram showing switch control and current direction when charging the second battery 150.

When the second battery 150 is charged in a state in which the engine rotates the rotor, the motor controller 130 may apply current to the field coil via the first battery during a predetermined time. When the predetermined time has elapsed, the motor controller 130 may turn the second switch 192 on such that current is not applied to the field coil and control the field current value such that the output voltage of the stator becomes equal to or greater than the charging voltage of the second battery 150.

Figure 8:
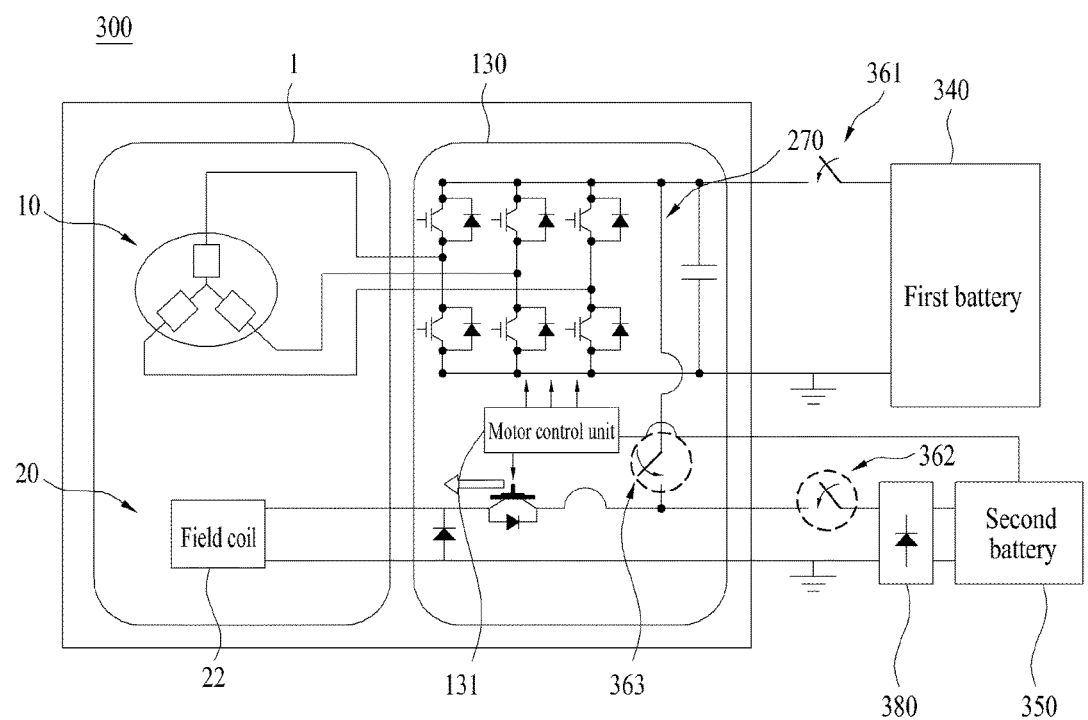
FIG. 8 is a circuit diagram showing a driving apparatus for an electric vehicle according to a third implementation of the present application.
Figure 9A:
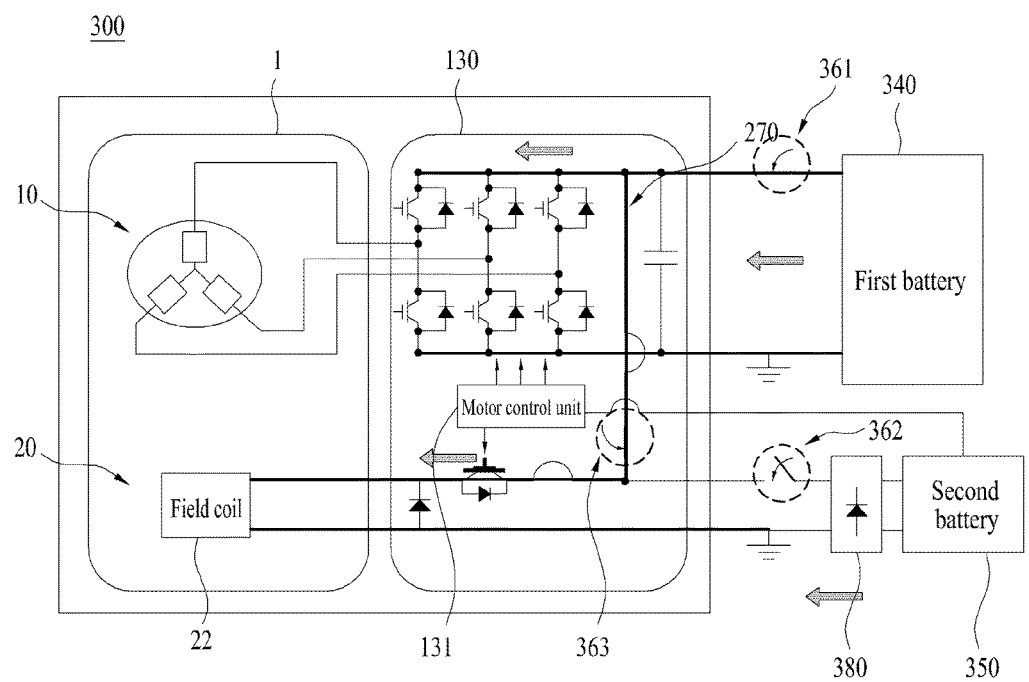
FIGS. 9a to 9c are circuit diagrams illustrating operation states of the driving apparatus for the electric vehicle shown in FIG. 8.
Figure 9B:
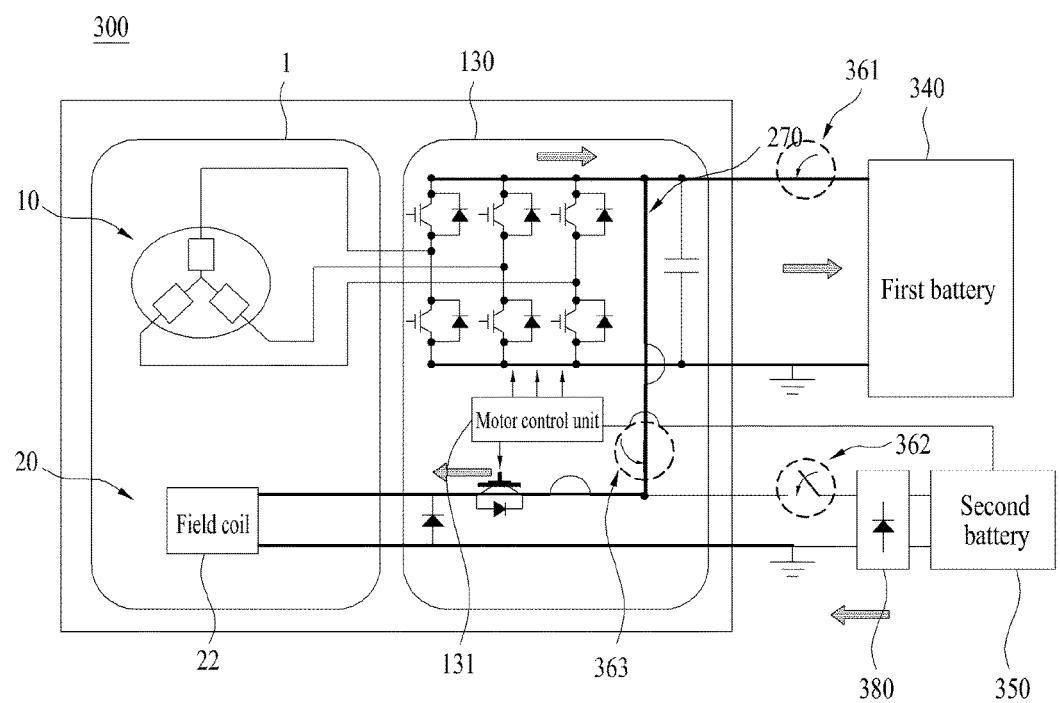
Figure 9C:
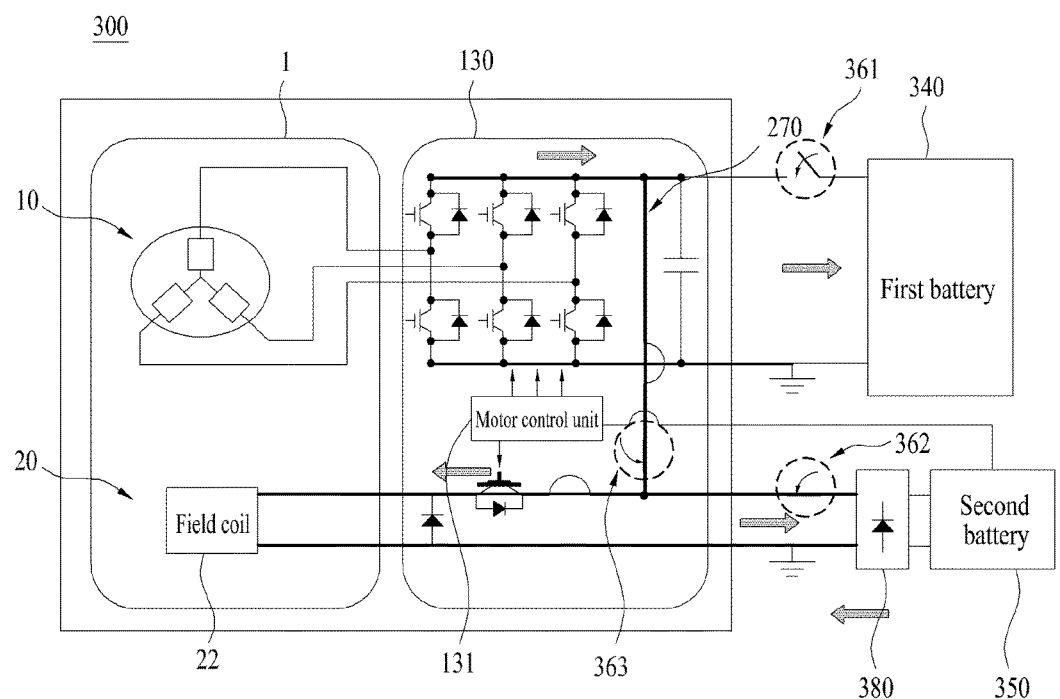

FIG. 8 is a circuit diagram showing a driving apparatus 300 for an electric vehicle according to a third implementation of the present application, and FIGS. 9a to 9c are circuit diagrams illustrating operation states of the driving apparatus for the electric vehicle shown in FIG. 8.

Referring to FIG. 8, in the third implementation, a first switch 361 is provided between the output voltage end of the motor and a first battery 340, a second switch 362 is provided between the output voltage end of the motor and a second battery, and a third switch 363 is provided between the output voltage end of the field coil and the output voltage end of the armature coil.

That is, in the third implementation, the features of the first implementation and the second implementation may be simultaneously applied. More specifically, the motoring operation of the motor 1 and the process of charging the first and second batteries 340 and 350 are equal to those of the first implementation.

FIG. 9a is a circuit diagram showing switch control and current direction in the motoring operation of the motor 1.

When the motoring operation of the field winding motor 1 is required, the motor controller 130 turns the first switch 261 and the third switch 363 on and turns the second switch 362 off.

In addition, the motor controller 130 may drive the motor 1 using the first battery 140 such that the motor 1 drives the engine 110 or assists driving torque.

FIG. 9b is a circuit diagram showing switch control and current direction when charging the first battery 340.

When the first battery is charged in a state in which the engine rotates the rotor, the motor controller 130 may turn the first and third switches 361 and 363 on and turn the second switch 362 off. The motor controller 130 may control the field current value such that the output voltage of the stator becomes equal to or greater than the charging voltage of the first battery 340.

FIG. 9c is a circuit diagram showing switch control and current direction when charging the second battery 350.

When the second battery 350 is charged in a state in which the engine rotates the rotor, the motor controller 130 may apply current to the field coil via the first battery 340 during a predetermined time. When the predetermined time has elapsed, the motor controller 130 may turn the second and third switches 362 and 363 on and turn the first switch 361 off such that current is not applied to the field coil. The motor controller 30 may control the field current value such that the output voltage of the stator becomes equal to or greater than the charging voltage of the second battery 350.

Figure 10:
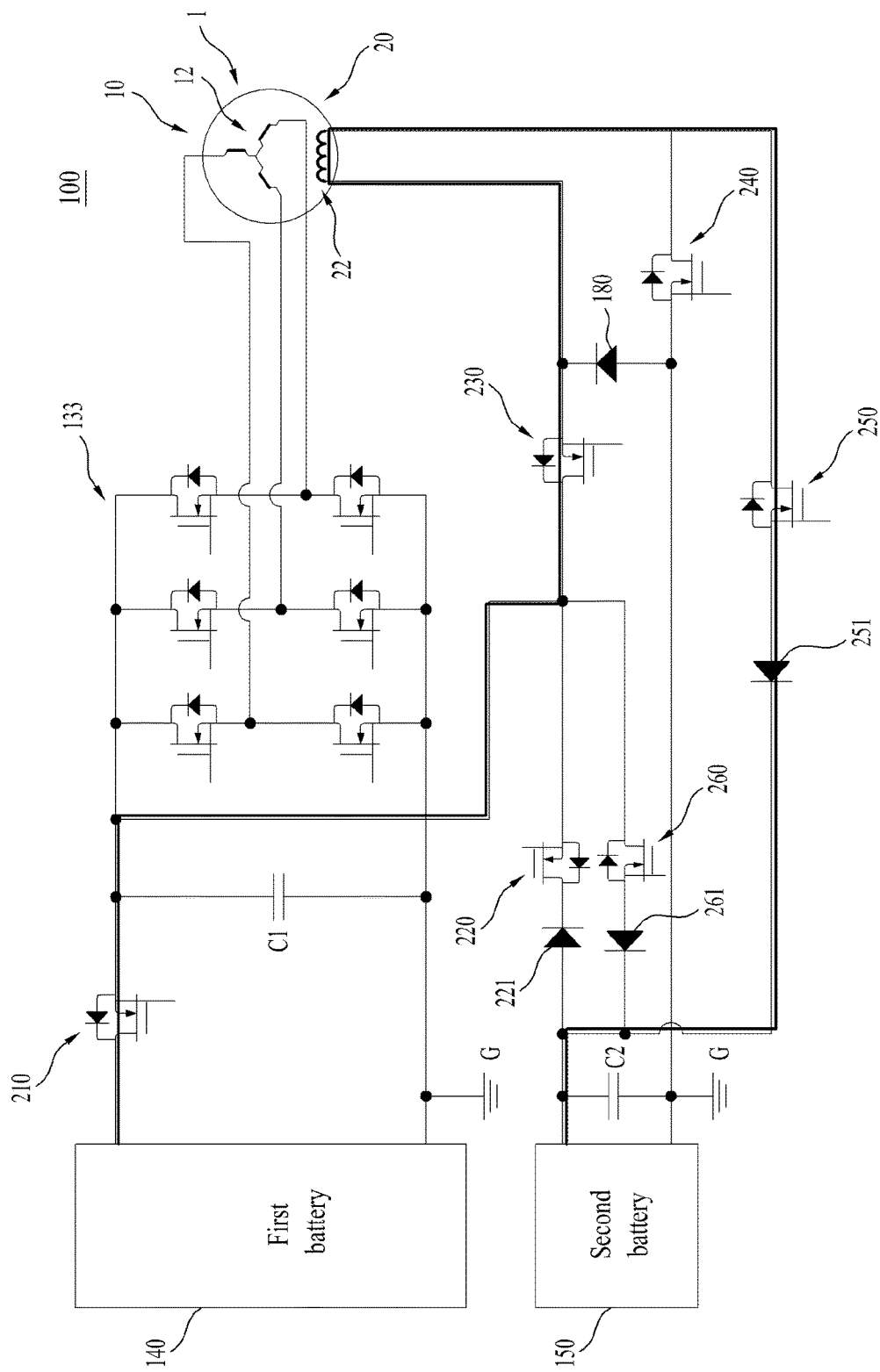
FIG. 10 is a circuit diagram illustrating a first operation state of a driving apparatus for an electric vehicle according to one implementation of the present application.

FIG. 10 is a circuit diagram illustrating a first operation state of a driving apparatus 100 for an electric vehicle according to one implementation of the present application.

Referring to FIGS. 1 and 10, the driving apparatus 100 for the electric vehicle includes a motor 1 including a rotor 20 having a field coil 22 and a stator 10 having an armature coil 12, an engine 110 (see FIG. 1) for selectively rotating the rotor 20, a first battery 140 for driving the motor 1 or chargeable by the motor and a second battery 150 chargeable by the motor 1 and having a charging voltage lower than that of the first battery 140.

The driving apparatus 400 includes a motor controller 130. The motor controller 130 includes an inverter circuit 133 connected to the armature coil 12 and a field current controller 132 connected to the field coil 22.

In the field current controller 132, a diode 180 and a control switching element 230 are provided so as to configure a buck converter together with the first battery 140, the second battery 150 and the field coil 22.

The buck converter is used when an output voltage lower than an input voltage is required. More specifically, the field coil 22 corresponds to an inductor of a general buck converter, the first battery 140 corresponds to the input voltage (e.g., 43 V), the second battery 150 corresponds to the output voltage (e.g., 12 V), and the voltage across the diode 180 may be controlled by the control switching element 230.

That is, without a separate converter, the buck converter may be configured by further providing the diode 180 and the control switching element 230 in addition to the first battery 140, the second battery 150 and the field coil 22.

At this time, the motor controller 130 may perform pulse width modulation (PWM) control (duty ratio control) with respect to the control switching element 230 so as to control the field current value applied to the field coil 22.

The control switching element 230 may be an insulated-gate bipolar transistor (IGBT) switching element or a metal-oxide-semiconductor field effect transistor (MOSFET) switching element. In the control switching element 230, a flywheel diode may be provided. In addition, the control switching element 230 may be referred to as a third switching element, for convenience of description.

In addition, the motor controller 130 may charge the second battery 150 with the charging voltage of the first battery 140 via the buck converter in a state in which the engine is stopped.

Referring to FIG. 10, the driving apparatus 100 for the electric vehicle may further include a first switching element 210 provided between the control switching element 230 and the first battery and a fifth switching element 250 provided between the field coil 22 and the second battery 150.

At this time, when the second battery 150 is charged using the first battery 140 in a state in which the engine 110 is stopped, the motor controller 130 may turn the first and fifth switching elements 210 and 250 on and perform PWM control with respect to the control switching element 230, thereby controlling the field current value.

In this case, the voltage charged in the first battery 140 may be supplied to the second battery 150 via the first battery 140, the first switching element 210, the control switching element 230, the field coil 22 and the fifth switching element 250.

More specifically, the driving apparatus 100 may include a first switching element 210 provided between the control switching element 230 and the first battery 140, a second switching element 220 provided between the second battery 150 and the control switching element 230 and a fourth switching element 240 provided between the field coil 22 and ground G.

The driving apparatus 100 may include a fifth switching element 250 provided between the field coil 22 and the second battery 150 and a sixth switch provided between the second battery 150 and the control switching element 230 in parallel to the second switching element 220.

At this time, the first to sixth switching elements 210 to 260 may be IGBT switching elements or MOSFET switching elements. In the first to sixth switching elements 210 to 260, respective flywheel diodes may be provided.

The second switching element 220 may be provided such that current is supplied from the second battery 150 to the field coil 22 and the sixth switching element 260 may be provided such that current output from the armature coil 12 is supplied to the second battery 150.

The flywheel diode of the second switching element 220 and the flywheel diode of the sixth switching element 260 may be provided in opposite directions.

A first diode 221 may be provided between the second switching element 220 and the second battery 150 and a second diode 261 may be provided between the sixth switching element 260 and the second battery 150.

The first diode 221 may be provided to supply current from the second battery 150 to the field coil 22 and the second diode 261 may be provided to supply current output from the armature coil 12 to the second battery 150.

In addition, a third diode 251 may be provided between the fifth switching element 250 and the second battery 150.

The third diode 251 may be provided to only flow current from the field coil 22 to the second battery 150.

Reference numeral C1 denotes a first capacitor provided at the side of the first battery 140 and reference numeral C2 denotes a second capacitor provided at the side of the second battery 150.

At this time, when the second battery 150 is charged via the first battery 140 in a state in which the engine 10 is stopped, the motor controller 130 turns the first and fifth switching elements 210 and 250 on, turns the second, fourth and sixth switching elements 220, 240 and 260 off and performs PWM control with respect to the control switching element 230, thereby controlling the field current value.

Figure 11:
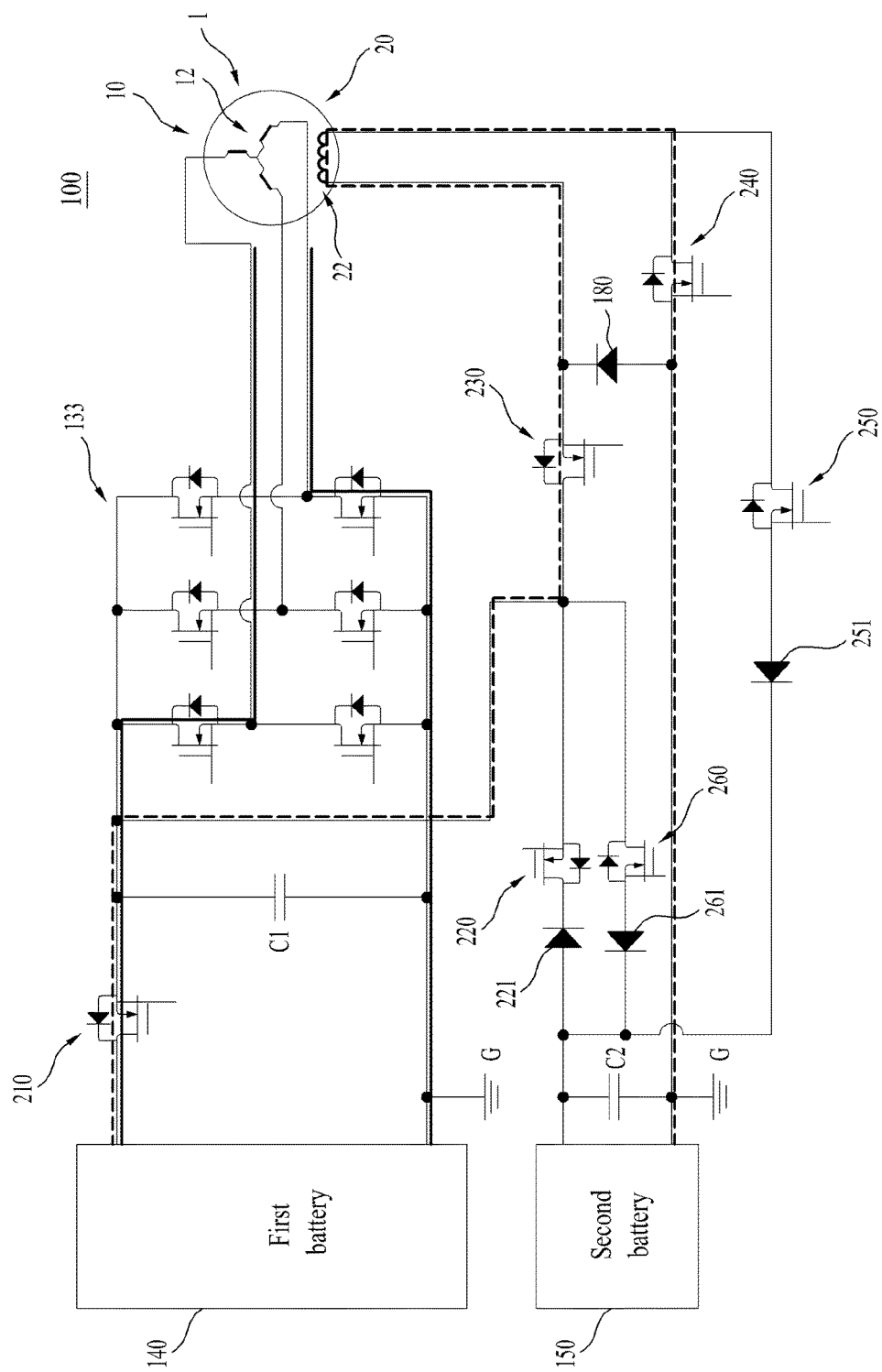
FIGS. 11 and 12 are circuit diagrams illustrating a second operation state of a driving apparatus for an electric vehicle according to one implementation of the present application.
Figure 12:
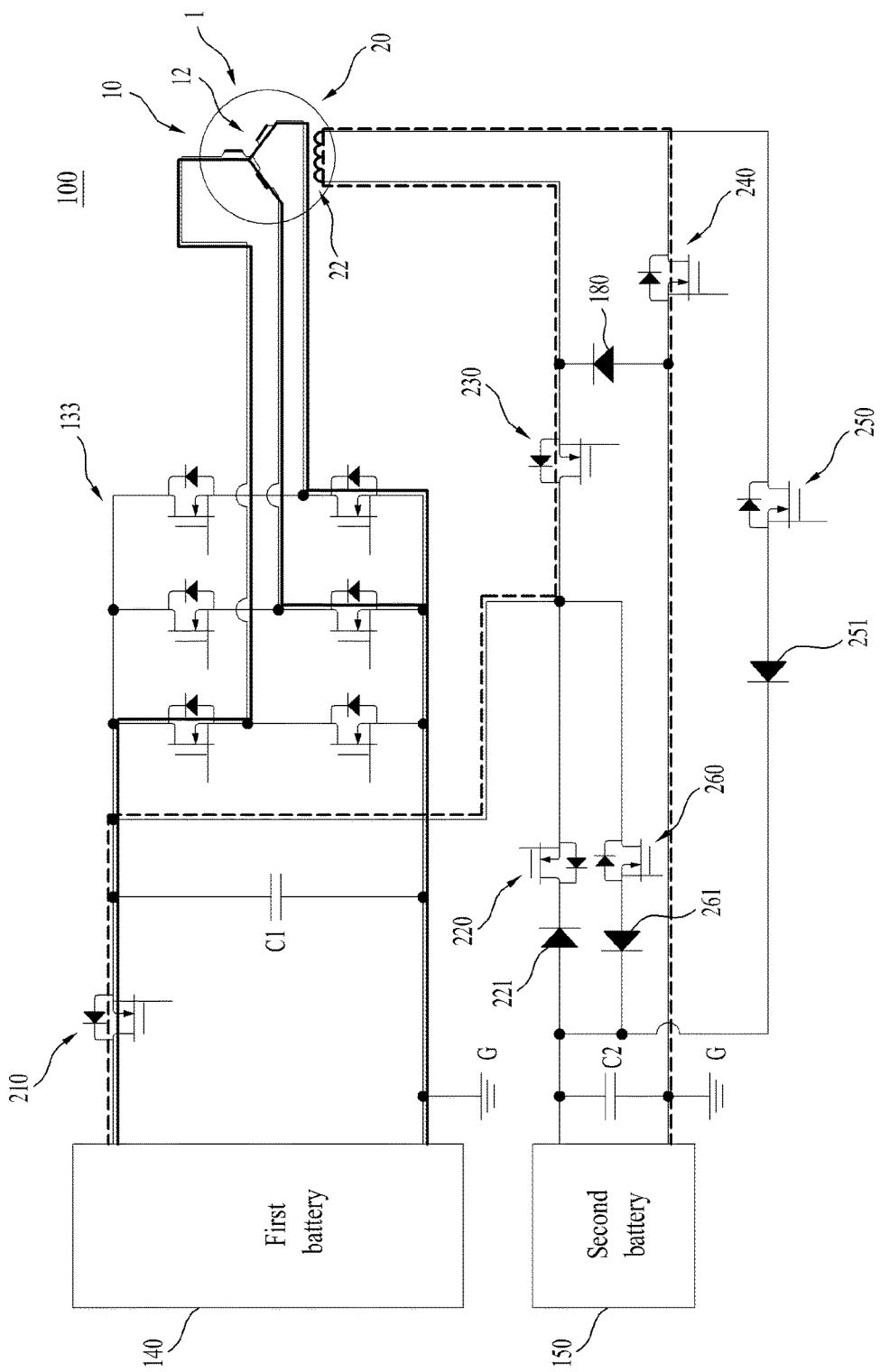

FIGS. 11 and 12 are circuit diagrams illustrating a second operation state of a driving apparatus for an electric vehicle according to one implementation of the present application.

Referring to FIG. 11, when the first battery 140 is charged in a state in which the engine 110 rotates the rotor 20, the motor controller 130 turns the first and fourth switching elements 210 and 240 on and control the field current value in order to excite the field coil 22 with current from the first battery 140. Here, the field current value may be controlled through the control switching element 230 and excitation amount may be proportional to charging amount.

In addition, the first battery 140 may be charged with current supplied from the armature coil 12 via the inverter circuit 133.

More specifically, when the first battery 140 is charged in a state in which the engine 130 rotates the rotor 20, the motor controller 130 may turn the first and fourth switching elements 210 and 240 on, turn the second, fifth and sixth switching elements 220, 250 and 260 off, and control the field current value in order to excite the field coil 22 with the current from the first battery 140.

In addition, the motor controller 130 may control the field current value such that the output voltage of the stator 10 becomes equal to or greater than the charging voltage of the first battery 140. In the motor controller 130, the output voltage of the stator and the field current value corresponding to the output voltage of the stator may be stored.

Current may be initially delivered from the first battery 140 to the field coil 22 to magnetize the rotor 20, thereby generating a voltage. If the generated voltage is increased to a level for charging the first battery 140 (e.g., 43 V or 48 V), the first battery 140 starts to be charged.

Referring to FIG. 12, the motor controller 130 may charge the first battery 140 in the regenerating mode. At this time, the on/off state of each switching element is equal to the on/off state of the switching element described with reference to FIG. 12.

At this time, the motor controller 130 may vector-control the inverter circuit 133 so as to generate negative torque.

That is, in the regenerating mode, the motor controller 130 may control the inverter circuit 133 while controlling the field current value.

Figure 13:
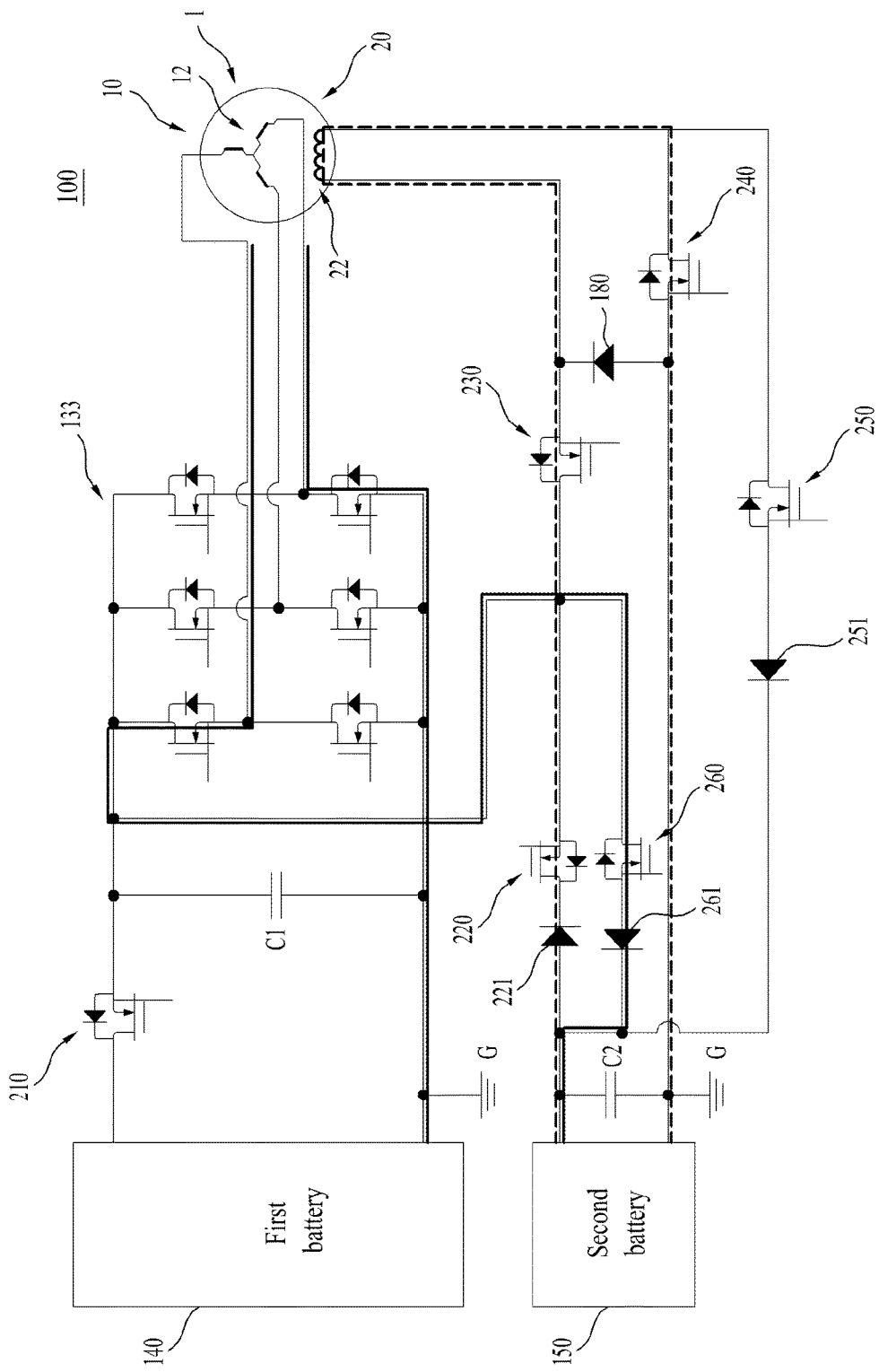
FIGS. 13 and 14 are circuit diagrams illustrating a third operation state of a driving apparatus for an electric vehicle according to one implementation of the present application.
Figure 14:
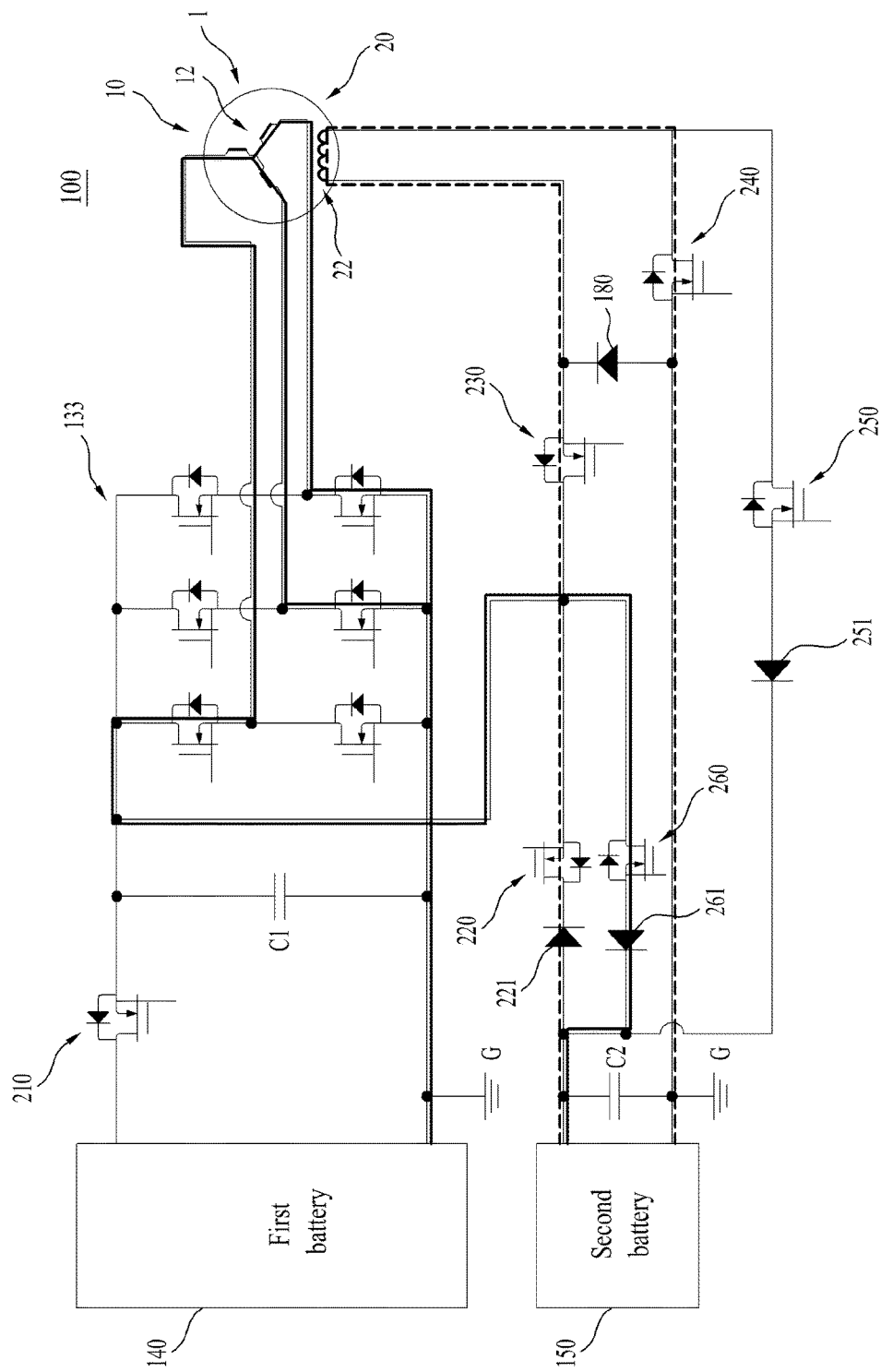

FIGS. 13 and 14 are circuit diagrams illustrating a third operation state of a driving apparatus for an electric vehicle according to one implementation of the present application.

Referring to FIG. 13, when the second battery 150 is charged in a state in which the engine 110 rotates the rotor 20, the motor controller 130 may turn the second, fourth and sixth switching elements 220, 240 and 260 on and control the field current value in order to excite the field coil with the current from the second battery 150.

Here, the field current value may be controlled through the control switching element 230 and excitation amount may be proportional to charging amount. The second battery

150 may be charged by the current supplied from the armature coil 12 via the inverter circuit 133.

More specifically, when the second battery 150 is charged in a state in which the engine 110 rotates the rotor 20, the motor controller 130 may turn the second, fourth and sixth switching elements 220, 240 and 260 on, turn the first and fifth switching elements 210 and 250 off and control the field current value in order to excite the field coil 22 with current from the second battery 150.

In one implementation, current is initially delivered from the second battery 150 to the field coil 22 to magnetize the rotor 20, thereby generating a voltage. When the generated voltage is increased to a level for charging the second battery 150 (e.g., 12 V), the second battery 150 starts to be charged. At this time, the motor controller 130 controls the field current of the field coil 22 via the field current controller 132 such that the generated voltage becomes 12 V.

Referring to FIG. 14, when the second battery 150 is charged in the regenerating mode, the motor controller 130 may vector-control the inverter circuit 133 to generate negative torque. At this time, the on/off state of each switching element is equal to the on/off state of the switching element described with reference to FIG. 14.

That is, in the regenerating mode, the motor controller 130 may control the inverter circuit 133 while controlling the field current value.

Figure 15:
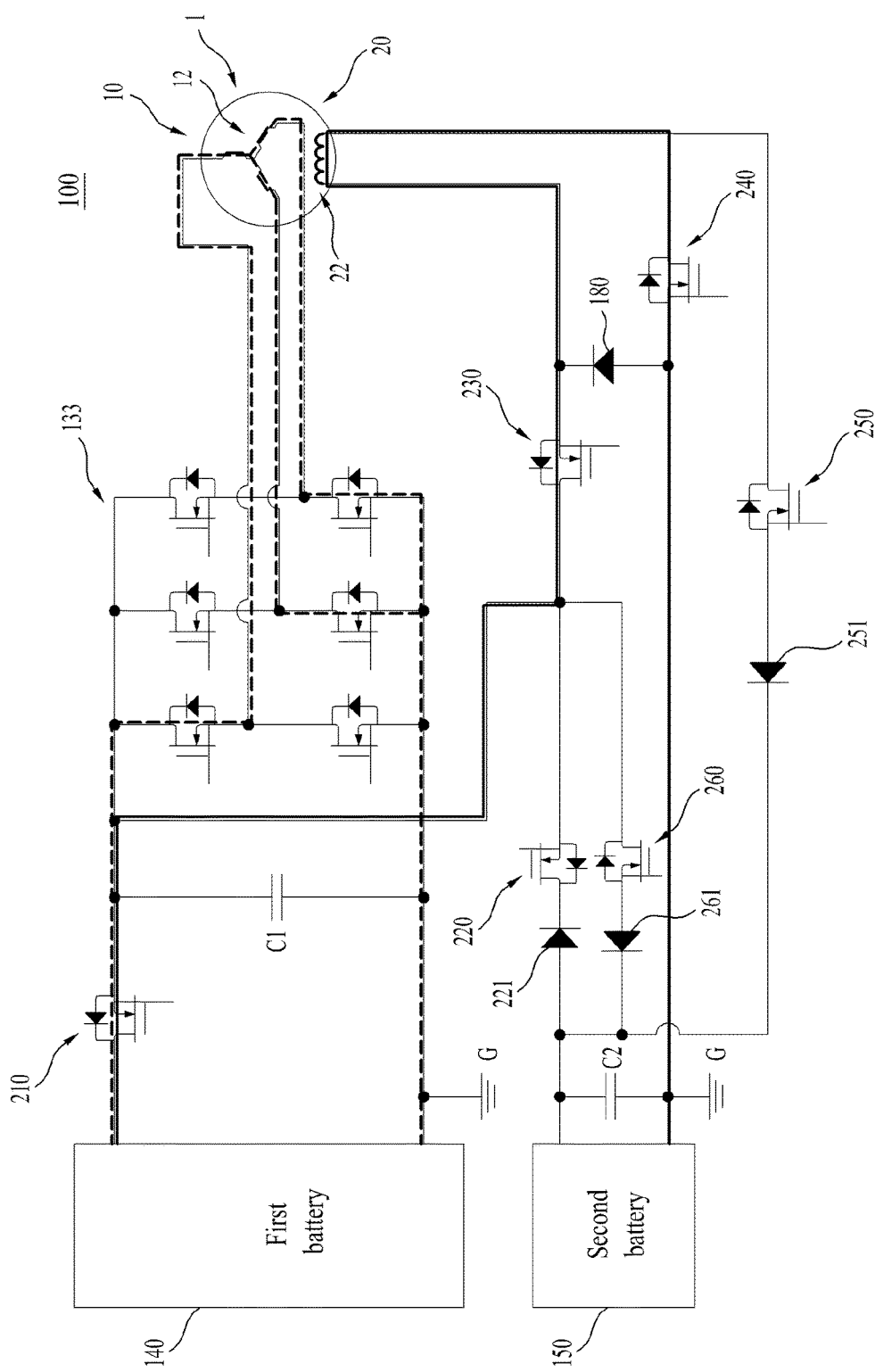
FIG. 15 is a circuit diagram illustrating a fourth operation state of a driving apparatus for an electric vehicle according to one implementation of the present application.

FIG. 15 is a circuit diagram illustrating a fourth operation state of a driving apparatus for an electric vehicle according to one implementation of the present application.

Referring to FIG. 15, when the motor 1 rotates via the first battery 140, the motor controller 130 may turn the first and fourth switching elements 210 and 240 on and turn the second, fifth and sixth switching elements 220, 250 and 260 off.

More specifically, when the engine 110 starts up and assists low-speed torque, power from the first battery 140 may be input to the inverter circuit 133 to supply current to the rotor 20 and the stator 10, thereby driving the motor 1.

At this time, the motor 1 may drive the engine 110 or assist driving torque.

As described above, in a state in which the engine is driven by controlling the on/off state of the first to sixth switching elements 210 to 260 and controlling the field current value applied to the field coil 22, the first battery 140 or the second battery 150 may be selectively charged. In addition, in a state in which the engine is stopped, the second battery 150 may be charged via the first battery 140.

As described above, the driving apparatus for the electric vehicle according to one implementation of the present application can charge the other batteries using any one battery in a state in which an engine is stopped, reduce a weight and volume thereof, and make better use of a space.

The driving apparatus for the electric vehicle according to one implementation of the present application can control a voltage generated by an ISG and thus selectively charge a plurality of batteries having different charging voltages without using a separate converter.

It will be apparent to those skilled in the art that various modifications and variations can be made in the present application without departing from the spirit or scope of the applications. Thus, it is intended that the present application covers the modifications and variations of this application provided they come within the scope of the appended claims and their equivalents.

What is claimed is:

1. A driving apparatus for an electric vehicle, comprising:
   a motor including a rotor, on which a field coil is wound, and a stator, on which an armature coil is wound;
   a first battery configured to drive the motor or configured to be chargeable by the motor;
   a second battery configured to be chargeable by the motor and having a charging voltage lower than that of the first battery;
   an inverter circuit electrically connected to the armature coil;
   a control switching element, a first terminal of which is electrically connected to a first terminal of the field coil;
   a first switching element electrically connected between a second terminal of the control switching element and the first battery;
   a second switching element electrically connected between a second terminal of the field coil and the second battery;
   a diode electrically connected between the first terminal of the field coil and ground; and
   a motor controller configured to turn the first and the second switching elements on, and charge the second battery using a voltage from the first battery by performing Pulse Width Modulation (PWM) control with respect to the control switching element,
   wherein the first battery, the second battery, the diode, the control switching element, and the field coil define a buck converter,
   wherein the motor controller is configured to charge the second battery using the voltage from the first battery through the buck converter, and
   wherein the motor controller is configured, based on the second battery being charged using the voltage from the first battery, to supply the voltage from the first battery to the second battery through the first switching element, the control switching element, and the field coil.

2. The driving apparatus for the electric vehicle according to claim 1, further comprising a third switching element electrically connected between the second terminal of the field coil and ground,
   wherein the motor controller is configured to activate the first switching element and the third switching element, and charge the first battery by performing the PWM control with respect to the control switching element.

3. The driving apparatus for the electric vehicle according to claim 2, wherein the motor controller is configured to charge the first battery in a regenerating mode by generating negative torque by vector-controlling the inverter circuit.

4. The driving apparatus for the electric vehicle according to claim 1, further comprising:
   a third switching element electrically connected between the second terminal of the field coil and ground;
   a fourth switching element electrically connected between the second battery and the second terminal of the control switching element; and
   a fifth switching element electrically connected between the second battery and the second terminal of the control switching element and electrically connected to the fourth switching element in parallel,
   wherein the motor controller is configured to activate the third switching element, the fourth switching element, and the fifth switching element, and charge the second battery by performing the PWM control with respect to the control switching element.

5. The driving apparatus for the electric vehicle according to claim 4, wherein the motor controller is configured to charge the second battery in a regenerating mode by generating negative torque by vector-controlling the inverter circuit.

6. The driving apparatus for the electric vehicle according to claim 4,
wherein the third switching element supplies current from the second battery to the field coil by being activated,
wherein the fifth switching element supplies current from the armature coil to the second battery by being activated.

7. The driving apparatus for the electric vehicle according to claim 4, wherein the motor controller is configured, based on the second battery being charged using the voltage from the first battery, to supply the voltage from the first battery to the second battery through the first switching element, the control switching element, the field coil, and the fifth switching element.

8. The driving apparatus for the electric vehicle according to claim 1, further comprising:
a third switching element electrically connected between the second terminal of the field coil and ground;
a fourth switching element electrically connected between the second battery and the second terminal of the control switching element; and
a fifth switching element electrically connected between the second battery and the second terminal of the control switching element and electrically connected to the fourth switching element in parallel,
wherein the fifth switching element supplies current from the second battery to the field coil by being activated,
wherein the fifth switching element supplies current from the armature coil to the second battery by being activated.

9. The driving apparatus for the electric vehicle according to claim 8, further comprising an engine configured to selectively rotate the rotor,
wherein the motor controller is configured to activate the first switching element and the second switching element, deactivate the third switching element, the fourth switching element, and the fifth switching element, and charge the second battery using a voltage from the first battery by performing the PWM control with respect to the control switching element in a state in which an engine is stopped.

10. The driving apparatus for the electric vehicle according to claim 8, further comprising an engine configured to selectively rotate the rotor,
wherein the motor controller is configured to activate the first switching element and the third switching element, deactivate the second switching element, the fourth switching element, and the fifth switching element, and charge the first battery by performing the PWM control with respect to the control switching element in a state in which an engine rotates the rotor.

11. The driving apparatus for the electric vehicle according to claim 10, wherein the motor controller is configured to charge the first battery in a regenerating mode by generating negative torque by vector-controlling the inverter circuit.

12. The driving apparatus for the electric vehicle according to claim 8, wherein the motor controller is configured to activate the third switching element, the fourth switching element, and the fifth switching element, deactivate the first switching element and the second switching element, and charge the second battery by performing the PWM control with respect to the control switching element.

13. The driving apparatus for the electric vehicle according to claim 12, wherein the motor controller is configured to charge the first battery in a regenerating mode by generating negative torque by vector-controlling the inverter circuit.

14. The driving apparatus for the electric vehicle according to claim 8, wherein the motor controller is configured to activate the first switching element and the third switching element, deactivate the second switching element, the fourth switching element, and the fifth switching element, and rotate the motor using a voltage from the first battery by performing the PWM control with respect to the control switching element.

15. The driving apparatus for the electric vehicle according to claim 1, further comprising a third diode electrically connected between the fifth switching element and the second battery,
wherein the motor controller is configured, based on the second battery being charged using the voltage from the first battery, to supply the voltage from the first battery to the second battery through the first switching element, the control switching element, the field coil, and the third diode.

* * * * *